United States Patent
Lin et al.

(10) Patent No.: US 10,547,621 B2
(45) Date of Patent: Jan. 28, 2020

(54) PERSISTENT MUTABLE SHARING OF ELECTRONIC CONTENT

(71) Applicant: Microsoft Technology Licensing, LLC, Redmond, WA (US)

(72) Inventors: Eugene S. Lin, Seattle, WA (US); Robert G. Hawking, Seattle, WA (US); Hui Huang, Bellevue, WA (US); Rafael Lopez-Uricoechea, Seattle, WA (US); Sean L. G. Livingston, Bothell, WA (US)

(73) Assignee: MICROSIFT TECHNOLOGY LICENSING, LLC, Redmond, WA (US)

( * ) Notice: Subject to any disclaimer, the term of this patent is extended or adjusted under 35 U.S.C. 154(b) by 94 days.

(21) Appl. No.: 15/362,155

(22) Filed: Nov. 28, 2016

(65) Prior Publication Data

US 2018/0152460 A1 May 31, 2018

(51) Int. Cl.
| | |
|---|---|
| *G06F 21/62* | (2013.01) |
| *H04L 29/06* | (2006.01) |
| *G06F 21/33* | (2013.01) |
| *G06F 16/955* | (2019.01) |
| *G06F 16/176* | (2019.01) |
| *H04L 29/12* | (2006.01) |

(52) U.S. Cl.
CPC .......... *H04L 63/108* (2013.01); *G06F 16/176* (2019.01); *G06F 16/9566* (2019.01); *G06F 21/335* (2013.01); *G06F 21/6218* (2013.01); *H04L 61/1582* (2013.01); *G06F 2221/2141* (2013.01)

(58) Field of Classification Search
CPC combination set(s) only.
See application file for complete search history.

(56) References Cited

U.S. PATENT DOCUMENTS

| | | | |
|---|---|---|---|
| 5,276,901 A | 1/1994 | Howell et al. | |
| 7,376,709 B1 * | 5/2008 | Brei | G06F 17/30876 |
| | | | 707/999.003 |

(Continued)

FOREIGN PATENT DOCUMENTS

WO    2018111377 A1    6/2018

OTHER PUBLICATIONS

"International Search Report and Written Opinion Issued in PCT Application No. PCT/US2017/063165", dated Feb. 21, 2018, 12 Pages.

(Continued)

*Primary Examiner* — Malcolm Cribbs
(74) *Attorney, Agent, or Firm* — Christopher R. Christenson; Kelly, Holt & Christenson PLLC

(57) ABSTRACT

A computing system is configured to provide access to electronic content. The computing system includes a processor, a data store, an access control system, and a user interface component. The data store is coupled to the processor and is configured to store the electronic content. The access control system control system is configured to selectively allow a requestor to access the electronic content based on a stored metadata setting that is associated with the link. The user interface component is configured to receive a setting change related to a share associated with the link and to persist metadata associated with the setting change.

15 Claims, 11 Drawing Sheets

(56) References Cited

U.S. PATENT DOCUMENTS

| | | | |
|---|---|---|---|
| 7,730,543 | B1 | 6/2010 | Nath |
| 8,544,068 | B2 | 9/2013 | Yates et al. |
| 8,732,853 | B1 | 5/2014 | Byrne et al. |
| 8,918,867 | B1 | 12/2014 | Salour |
| 9,053,117 | B2 | 6/2015 | Trebas et al. |
| 9,111,110 | B2 | 8/2015 | Subramani et al. |
| 9,208,181 | B2 | 12/2015 | Pandey et al. |
| 9,338,242 | B1 | 5/2016 | Suchland et al. |
| 9,361,473 | B2 | 6/2016 | Chou Fritz et al. |
| 9,367,646 | B2 | 6/2016 | Branton |
| 9,692,840 | B2 | 6/2017 | Fushman et al. |
| 9,860,255 | B2 | 1/2018 | Byrne et al. |
| 9,934,394 | B1 | 4/2018 | Stolboushkin |
| 10,140,434 | B2 | 11/2018 | Lopez-Uricoechea et al. |
| 2005/0138004 | A1 | 6/2005 | Teplitsky et al. |
| 2008/0242221 | A1* | 10/2008 | Shapiro ............... G06Q 30/02 455/3.06 |
| 2009/0320035 | A1 | 12/2009 | Ahlgren et al. |
| 2010/0198871 | A1* | 8/2010 | Stiegler ............ G06F 17/30168 707/783 |
| 2011/0258461 | A1 | 10/2011 | Bates |
| 2012/0109836 | A1 | 5/2012 | Chen et al. |
| 2012/0110474 | A1 | 5/2012 | Chen et al. |
| 2012/0136936 | A1 | 5/2012 | Quintuna |
| 2012/0284357 | A1 | 11/2012 | Meisels et al. |
| 2012/0324121 | A1 | 12/2012 | Carr et al. |
| 2013/0067303 | A1* | 3/2013 | Kantor ............... G06F 17/3089 715/205 |
| 2013/0067594 | A1* | 3/2013 | Kantor ............... G06F 16/9566 726/28 |
| 2013/0262559 | A1 | 10/2013 | Neerings et al. |
| 2013/0318589 | A1 | 11/2013 | Ford et al. |
| 2014/0033324 | A1 | 1/2014 | Kiang et al. |
| 2014/0067865 | A1 | 3/2014 | Kirigin |
| 2014/0067929 | A1 | 3/2014 | Kirigin et al. |
| 2014/0215551 | A1 | 7/2014 | Allain et al. |
| 2014/0215568 | A1 | 7/2014 | Kirigin et al. |
| 2014/0282901 | A1 | 9/2014 | Dwan et al. |
| 2014/0282921 | A1 | 9/2014 | Filman et al. |
| 2015/0007264 | A1 | 1/2015 | Maldaner |
| 2015/0033283 | A1 | 1/2015 | Mulder |
| 2015/0089623 | A1 | 3/2015 | Sondhi et al. |
| 2015/0135337 | A1 | 5/2015 | Fushman et al. |
| 2015/0310188 | A1 | 10/2015 | Ford et al. |
| 2016/0103801 | A1 | 4/2016 | Bortz et al. |
| 2016/0314314 | A1 | 10/2016 | Sirbu et al. |
| 2017/0323086 | A1 | 11/2017 | Lopez-uricoechea et al. |
| 2017/0364692 | A1 | 12/2017 | Lopez-uricoechea et al. |
| 2018/0089451 | A1 | 3/2018 | Lin |
| 2018/0115497 | A1 | 4/2018 | Lin et al. |
| 2018/0302441 | A1 | 10/2018 | Mulder |
| 2018/0343243 | A1 | 11/2018 | Shahine et al. |

OTHER PUBLICATIONS

"University of Waterloo: Records Management", https://uwaterloo.ca/records-management/university-waterloo-electronic-recordkeeping-metadata, Published on: Oct. 20, 2011, 10 pages.

"Google Cloud platform", http://web.archive.org/web/20150906132830/https:/cloud.google.com/storage/docs/cloud-console, Published on: Sep. 6, 2015, 16 pages.

"ownCloud: ownCloud 9.0 Server Administration Manual", https://doc.owncloud.org/server/9.0/admin_manual/configuration_files/file_sharing_configuration.html, Retrieved on: Oct. 24, 2016, 8 pages.

Stevenson, Dave, "Business IT: Do you use Dropbox? Here are some clever tricks", http://www.bit.com.au/Guide/313558,do-you-use-dropbox-here-are-some-clever-tricks.aspx, Published on: Aug. 29, 2012, 7 pages.

"Creating Shared Links", Retrieved From: https://web.archive.org/web/20170915184814/http://community.box.com/t5/How-To-Guides-for-Sharing/Shared-Links/ta-p/19523, Jul. 25, 2016, 6 Pages.

"OTP Verification", Retrieved From: https://drupal.org/project/otp_verification, Mar. 31, 2016, 4 Pages.

"Set File Sharing Permissions", Retrieved From: https://web.archive.org/web/20160501031008/https://support.google.com/a/answer/60781?hl=en, Retrieved on: Sep. 7, 2016, 6 Pages.

"Share files and folders", Retrieved From: https://support.google.com/docs/answer2494822?co=GENIE.Platform%3DDesktop&hl=en&oco=1, Retrieved Date: Sep. 7, 2016, 4 Pages.

"Share Files and Folders—Zoho", Retrieved From: https://web.archive.org/web/20170519130306/https:/www.zoho.com/docs/help/secure-sharing.html, May 19, 2017, 21 Pages.

"Shared Links: Overview And FAQs", Retrieved From: https://web.archive.org/web/20150809235659/http://community.box.com:80/t5/Collaboration-and-Sharing/Shared-Links-Overview-And-FAQs/ta-p/142, Jan. 30, 2015, 6 Pages.

"Sharing a Link—Amazon WorkDocs", Retrieved From: https://web.archive.org/web/20171129011641/http:/docs.aws.amazon.com:80/workdocs/latest/userguide/web_share_link.html, Nov. 29, 2017, 2 Pages.

"Sharing Files via Link", Retrieved From: https://help.salesforce.com/articleView?id=collab_files_sharing_via_link.htm&type=5, Sep. 6, 2016, 2 Pages.

"Skyhigh Compliance", Retrieved From: https://web.archive.org/web/20160507001006/https://www.skyhighnetworks.com/skyhigh-compliance/, Sep. 9, 2016, 5 Pages.

"Squid Access Control", Retrieved From: https://web.archive.org/web/20130113061942/http://www.deckle.co.uk:80/squid-users-guide/squid-access-control-and-access-control-operators.html, Jan. 13, 2013, 31 Pages.

"Non Final Office Action Issued in U.S. Appl. No. 15/333,587", dated Jan. 7, 2019, 24 Pages.

Zahavi, et al., "Links as a Service (LaAs): Guarnteed Tenant Isolation in the Shared Cloud", In Proceedings of the Symposium on Architectures for Networking and Communications Systems, Mar. 17, 2016, pp. 87-98.

"Activate Link Sharing Quickly via the "Get Shamble Link" Icon in Drive Web", Retrieved from: https://gsuiteupdates.googleblog.com/2016/03/activate-link-sharing-quickly-via-get.html, Mar. 29, 2016, 3 Pages.

Ang, Chris, "SharePoint Broken Links & Durable Links", Retrieved from: https://www.cognillo.com/blog/broken-links-sharepointhttps://www.cognillo.com/blog/broken-links-sharepoint/, Jun. 29, 2016. 11 Pages.

* cited by examiner

PERSISTENT MUTABLE SHARING OF ELECTRONIC CONTENT

BACKGROUND

Storage of electronic files, such as documents, photos, spreadsheets, presentations, videos, songs, and more is virtually a necessity in modern times. Centralized storage of and access to such files in a network-accessible manner allows the files to be accessed and maintained easily and effectively from a variety of network-connected devices. One form of such storage is an on-line storage platform that is accessible over the Internet and allows users and/or organizations to create accounts with the on-line storage provider in order to securely upload, access, edit, and delete such electronic files.

With the digital storage of electronic files, it is easy to share such files with others in order to collaborate on a document or a project. Sharing is sometimes accomplished by supplying a sharing link to a user who may then use the link to access the shared content on the online storage platform. Different links may provide different access, such as read only access or edit privileges. When sharing of an electronic resource is to be shared with more than a few users, such links may be insufficient to provide all users with suitable access. Further, if a sharing link to an electronic resource needs to be deactivated, it will affect all users who have received that sharing link.

The discussion above is merely provided for general background information and is not intended to be used as an aid in determining the scope of the claimed subject matter.

SUMMARY

A computing system is configured to provide access to electronic content. The computing system includes a processor, a data store, an access control system, and a user interface component. The data store is coupled to the processor and is configured to store the electronic content. The access control system control system is configured to selectively allow a requestor to access the electronic content based on a stored metadata setting that is associated with the link. The user interface component is configured to receive a setting change related to a share associated with the link and to persist metadata associated with the setting change.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
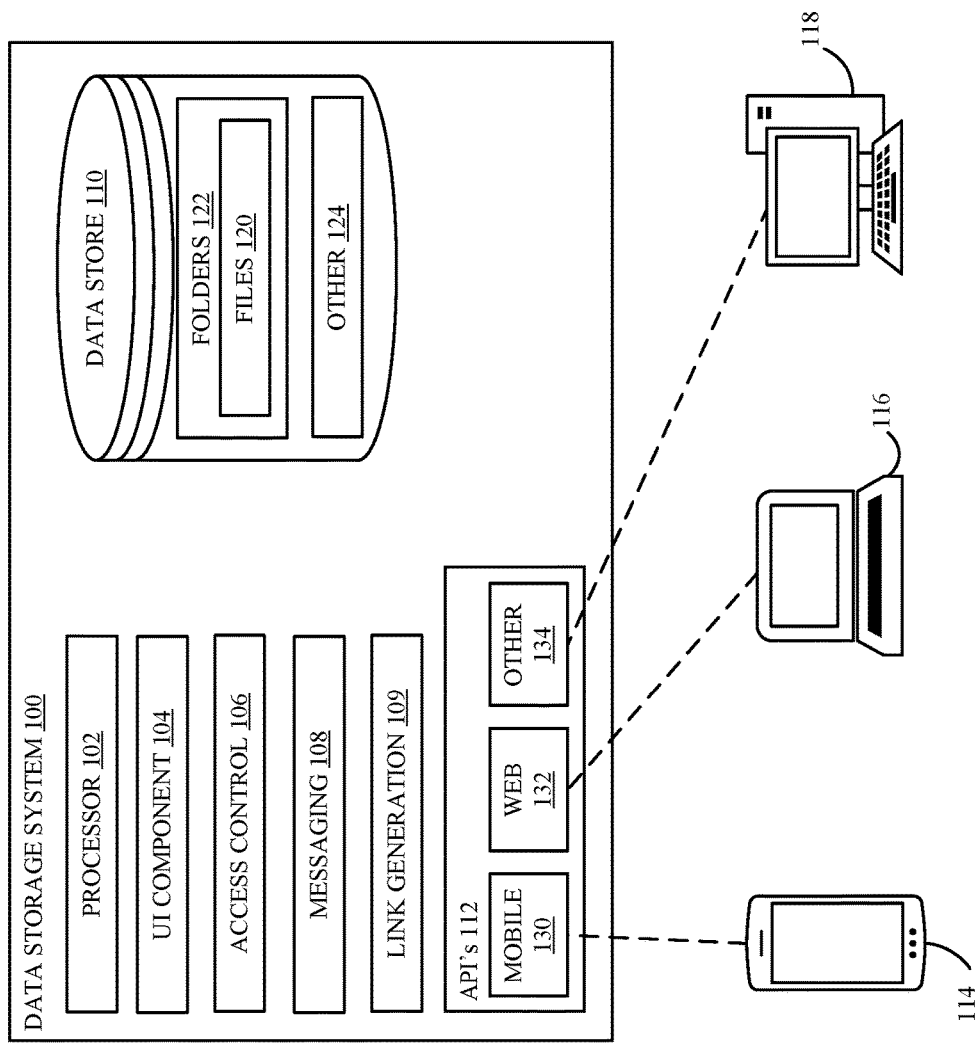
FIG. 1 is a diagrammatic view of a network-accessible data storage system with which embodiments described herein are particularly useful.

Currently, users of file sync and share services have limited options for sharing electronic content. Some implement sharing solutions that are limited to a single sharing state per shared object or item, where additional state changes affect the single share and matching sharing link given to end users. This significantly limits flexibility and usefulness of sharing operations as it requires all potential competing sharing operations intents to compromise on a single share per shared object or item.

More recently, one commercially available online sharing platform began allowing more than one sharing operation per shared object. The online sharing platform provides a series of different sharing link types, each type requiring replacement of the share to update settings or to restrict the intended audience for sharing on a given shared object. This allowed essentially a single share operation for each tuple of a given scope (company/organization wide or anonymous) for a given access level (read or edit), and prevented the creation of personalized shares for individual users based on their actions or with creating parallel shares with different expirations.

Within administrator defined sharing governance settings, end users should be able to perform sharing operations on electronic content (files, folders, or other types of data objects) within a system. This may include setting anonymous user capabilities for a share, setting access grants through the share, trimming availability of the share to a specified audience, or setting an expiration of the share. Such users expect that the intent of the sharing operation is durably stored and that background objects and security controls are updated to agree with the intent of the sharing operation and that the actual share can be changed after the fact to further expand or restrict the choices of the sharing operation without invalidating the existing sharing operation.

Embodiments disclosed herein generally provide an electronic data storage platform that allows improved sharing operations, management of information relative to such sharing operations, and sharing links that are less likely to be inadvertently deactivated. When an electronic resource (such as a file or folder) is to be shared with one or more users, a record is created of that sharing event along with metadata about the sharing event. One or more owners of the shared content can then view and modify properties of that record after it is created in order to track who has access, modify scope and permissions granted, and see history of how the resource was shared over time.

While embodiments described herein generally have wide applicability to any electronic system that is able to store electronic files and allow multiple users to selectively access and share such electronic files, the remainder of this description will be described with respect to an on-line data storage system that is accessible over the Internet. This embodiment is considered a cloud computing embodiment.

Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of the architecture as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 1 is a diagrammatic view of an on-line data storage system with which embodiments described herein are particularly useful. Data storage system 100 includes processor 102, user interface (UI) component 104, access control component 106, messaging component 108, and data store 110. Additionally, while not specifically shown in FIG. 1, data storage system 100 includes suitable circuitry or other arrangements to enable data storage provider 100 to connect to a network in order to provide access to devices 114, 116, and 118. Each of devices 114, 116, and 118 couples to or interacts with data storage system 100 via a suitable application programming interface 112. For example, mobile device 114 interacts with data storage system 100 through mobile device application API 130 while laptop computer 116 may interact with data storage system 100 via web API 132. Further still, it is expressly contemplated that other devices, such as computer 118, may interact with data storage system 100 via other API 134. Regardless, in one embodiment, all such interactions with data storage system 100 via the variety of user devices are through suitable application programming interfaces 112 appropriate for that particular modality.

Processor 102 is illustratively a computer processor that has associated memory and timing circuitry, not separately shown. Processor 102 is illustratively a functional part of data storage system 100 and facilitates the functionality of data storage system 100 in providing access to data in data store 110.

UI component 104 is illustratively controlled by other components, servers, or items in data storage provider 100 to generate user interface displays for users using devices 114, 116, and 118. Devices 114, 116, and 118 are merely provided as examples of various user devices that may be used to interact with system 100. In the illustrated example, device 114 is a mobile device, such as a smartphone; device 116 is a laptop or notebook computer; and device 118 is a desktop computer. It will be noted, however, there can also be a user interface component on devices 114, 116, and 118 which generates those user interface displays as well. Further, it will be noted that user interface component 104 can generate the user interface displays itself, or under the control of other items shown in FIG. 1.

The user interface displays illustratively include user input mechanisms that allow the users to control and manipulate data storage provider 100, in order to upload, access, share, and manage electronic files stored within data store 110. The user input mechanisms can include a wide variety of different types of user input mechanisms, such as links, icons, buttons, drop down menus, text boxes, check boxes, etc. In addition, the user input mechanisms can be actuated by the user in a wide variety of different ways. For instance, they can be actuated using touch gestures (where the display is touch sensitive), a hard or soft keyboard or keypad, a point and click device (such as a mouse or trackball), buttons, joysticks, or other actuators. Additionally, where data storage provider 100 or one of devices 114, 116, and 118 has speech recognition components, the user input mechanisms can also be actuated by using voice commands.

Access control component 106 may employ an access control list or other suitable structure that includes information that indicates permissions or access rights for each user or group of users that are able to use data storage provider 100. Additionally, access control component 106 may maintain a list of authorized users for each organization or tenant for which data storage provider 100 provides data storage services. In one embodiment, access control component 106 can provide digital directory services in order to authenticate and authorize users and/or various devices 114, 116, and 118. Accordingly, a list of users within the organization (i.e. internal users) will be maintained by access control component 106, thereby allowing access control component 106 to identify other users (outside of the organization) as any user who is not listed as a member of the particular organization. Such users are considered to be external users. Access control component 106 may also include a listing of one or more domains or tenants, and organizational content scope information indicating whether external sharing is allowed for that particular domain or tenant.

Messaging component 108 may include a messaging server or other suitable device or logic that is able to compose and/or send messages to users. Accordingly, messaging component 108 may include an e-mail server that supports the known Simple Mail Transfer Protocol (SMTP). However, messaging component 108 may also include an instant messaging server (SMS) or any other device or logic that is able to provide messages to users. Further still, in embodiments where access to data storage provider 100 is provided to one or more of devices 114, 116, and 118 via an application executing upon said devices. Messaging component 108 may include code and/or suitable circuitry to surface such messages or notifications within the application executing upon such user devices. While messaging component 108 is shown as a component of data storage provider 100, it is expressly contemplated that messaging component 108 may be remote from data storage provider 100 and controlled or otherwise engaged by data storage system 100 to generate suitable messages, such as external sharing invitations.

Link generation component 109 is configured to generate a sharing links to the electronic resource stored or otherwise managed by data storage system 100. When a user selects one or more electronic resources of the data storage system and defines how the electronic resource(s) should be shared, both internally and/or externally, link generation 109 generates a link that may be distributed or communicated to various users to allow such users to access the one or more electronic resources.

Data store 110 is shown as a single data store that is local to data storage provider 100. However, it will be noted that data store 110, may be comprised of a number of different data stores, all of which may be local to data storage provider 100, some of which may be local to data storage provider 100, or all of which may be remote therefrom. Data store 110 illustratively stores a number of electronic files 120 within folders 122. However, other forms of data 124 may also be stored by data store 110 and made available by data storage provider 100 for access by users. Data store 110 may also store the metadata associated with each sharing operation, as will be described in greater detail below.

Figure 2:
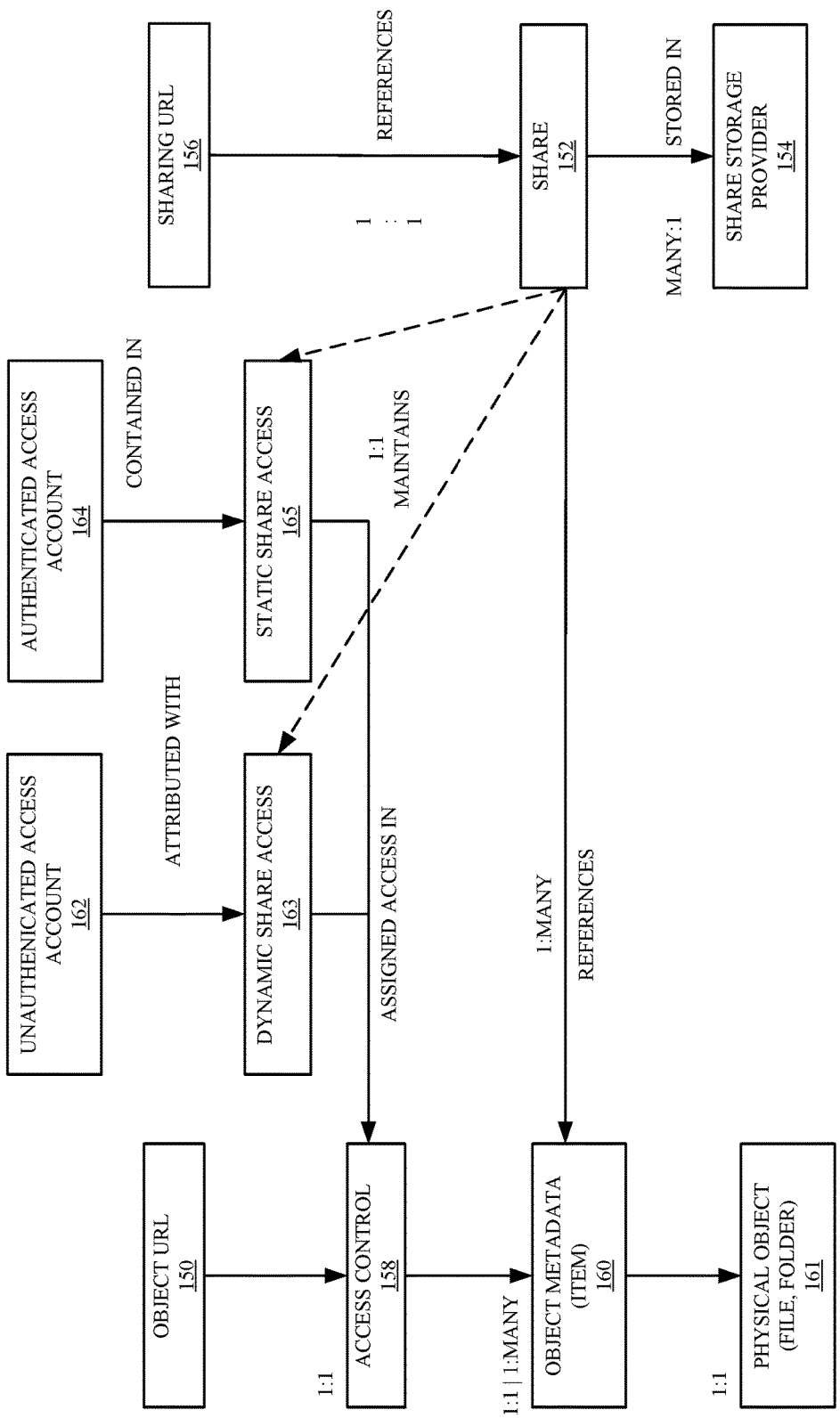
FIG. 2 is a logical block diagram illustrating various sharing relationships in accordance with one embodiment.

FIG. 2 is a logical block diagram illustrating various sharing relationships in accordance with one embodiment. When a share operation is conducted relative to a physical object 161, a new sharing object is created as at block 152, which is then persisted into the Share storage provider as indicated at block 154. The share operation then emits a sharing URL 156 back to the creator of the particular share such that the URL can be shared with other users. A link, as used herein, is a specific uniform resource locator (URL) that provides a way back to the shared content, or in the case of a sharing link, back to the shared content along with the specific share (sharing object) which in turn determines the settings and limitations to apply to user access through that sharing link. A share (specifically a sharing object and the metadata for the share) is not necessarily tied to a specific sharing link URL, as the form of that URL can change over time (for example issuing one link URL format originally, and later changing new issuances of the same share to instead be mobile device friendly URL format) while still allowing the older form to work as long as they all reference back to the same share identifier.

From the sharer's perspective, they have identified an item of electronic content, set share settings regarding the sharing operation and received a URL that allows sharing in accordance with the specified parameters. The settings may later be changed by the sharer or another responsible party to revise aspects of the sharing, such as the type of access, and/or duration of the sharing, without needing to change the link and thus redistribute it. Additionally, on access control block 158 as well as object metadata 160 the share operation is assigning principals that will act as access control entities for users. For example, for unauthenticated access 162, a dynamic share access claim or token is assigned to the access control list on behalf of the share, as indicated at block 163. Then, when a user attempts to use a link via unauthenticated access 162, they would have access because the access control list already has the principal that allows associated access. Alternately, in the case of a user who is authenticated, as indicated at block 164, they are added to the static share access 165, which is provided to access control block 158 to allow the user to access the content via the sharing link. In the event that any of the settings on the share are changed, for example, changing read permission to edit permission, then the access control block 158 is updated to change the dynamic share access and static share access accordingly. Then, as users employ that share, they will do so subject to the updated sharing settings.

Figure 3:
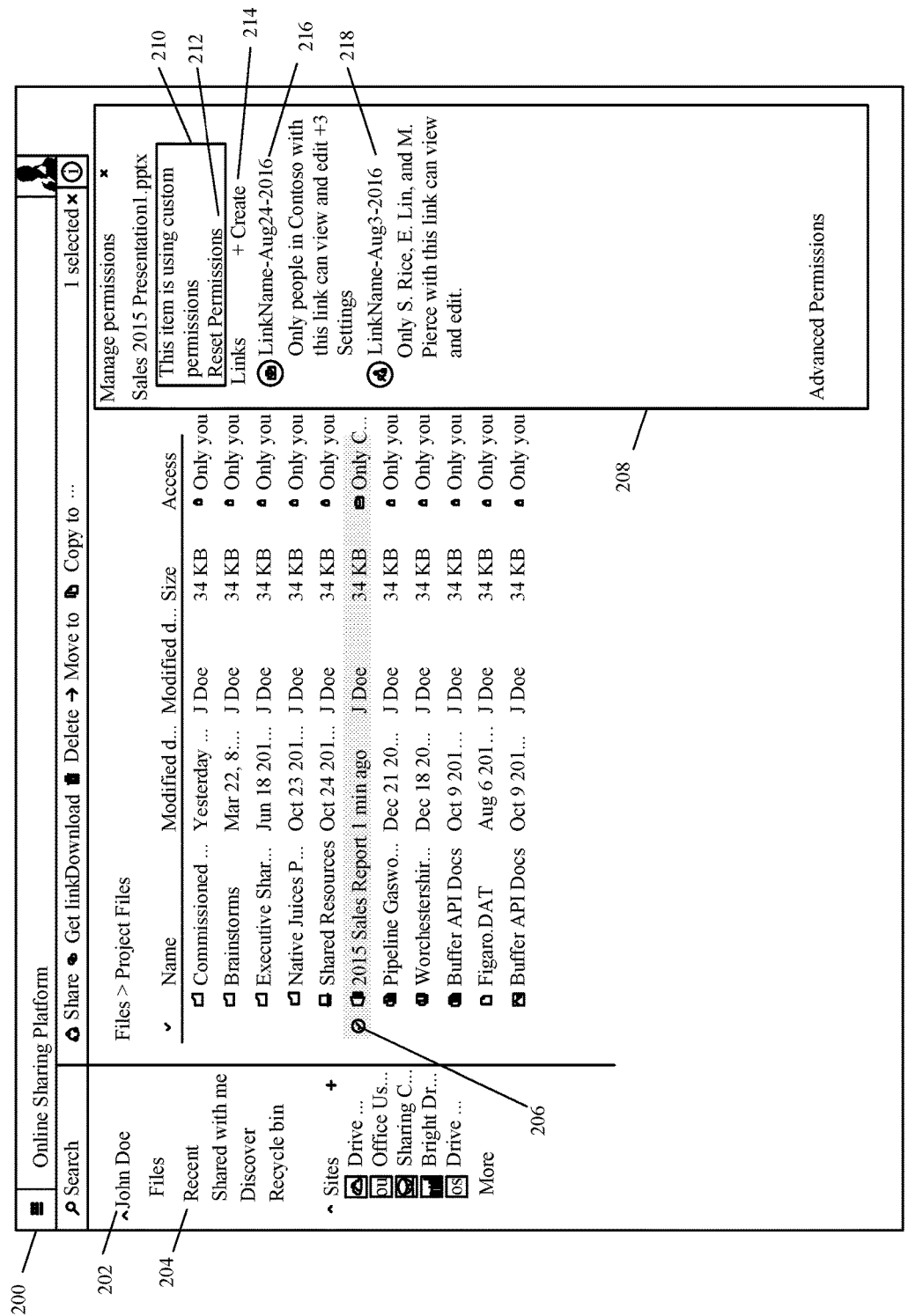
FIG. 3 is a screenshot of a user interface allowing a user to generate a sharing link relative to electronic content in accordance with one embodiment.

FIG. 3 is a screenshot of a user interface allowing a user to generate a sharing link relative to electronic content in accordance with one embodiment. User interface 200 is generated by user interface component 104 and rendered on a user's client device. In the example, the user interface is that of a desktop computer, however embodiments can be practiced with a wide array of devices and the user interfaces will vary based on the device type (e.g. smartphone, laptop computer, tablet, et cetera). User interface 200 includes an indication of the user "John Doe" as indicated at reference numeral 202 and a number of links 204 that can be used to select the user's files or content in any suitable manner. In the example shown, links 204 allow the selection of files; the display of recently interacted with content; content that is shared with the user; a link to discover new content; and a recycle bin. As shown in FIG. 3, the user may select an item of content, as shown at reference numeral 206. Upon selection, a permissions pane 208 is populated to show the user the sharing permissions relative to the selected item of content. In the example, the user has selected a file entitled, "2015 Sales Report.pptx" and pane 208 indicates that the item is using custom permissions, as indicated at notification 210. Additionally, notification 210 may include a reset element or link 212 that, upon actuation, resets all permissions relative to the item of content. Pane 208 also has a user interface element 214 that when selected allows the user to create a link to share the selected electronic content. When the user actuates element 214, the link is already preconfigured to share the selected electronic content. All the user needs to further specify are the users or groups who will user the sharing link. Additional settings include specifying the type of access (such as read only or edit) and any additional settings such as a termination date or time. Once the link is generated, the sharing settings metadata including the link URL, are saved in the data store 110.

In the example shown in FIG. 3, pane 208 indicates that the user has already generated a pair of sharing links 216, 218. Upon selection of either of links 216 or 218, the user will be brought to a permission details pane 220 that allows the user to view and change settings relative to the sharing that is provided by the selected link.

Figure 4:
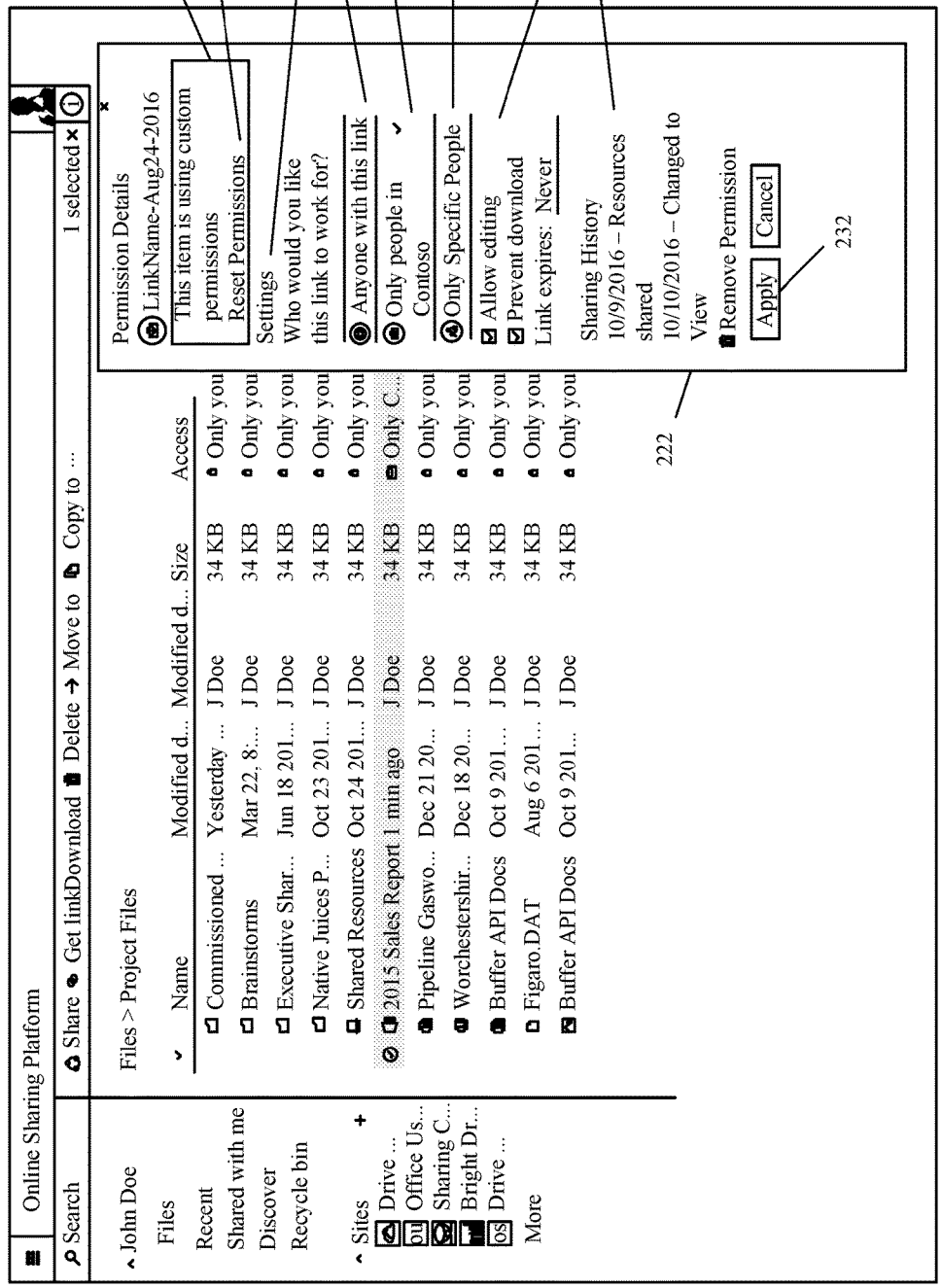
FIG. 4 is a screenshot of a user interface allowing a user to modify sharing settings relative to a sharing link in accordance with one embodiment.

FIG. 4 is a screenshot of a user interface allowing a user to modify sharing settings relative to a sharing link in accordance with one embodiment. In the example shown in FIG. 4, the user had selected link 216 in permissions pane 208 and thus permission details pane 220 shows the permission details for link 216 entitled LinkName--Aug24-2016. A notification 210 informs the user that the link is using custom permissions and provides a user interface element 212 that allows the user to easily reset the permissions relative to the selected link. A Settings portion 222 indicates the type of users with which the content is shared. In the example, by selecting element 224, the settings can be changed from the currently selected "Only people in Contoso" (i.e. the user's organization) to "Anyone with this link" thus changing the link to anonymous access. Alternately, the user may select element 226 and change the setting to "Only Specific People." When element 226 is selected, the user is further prompted to specify the user or users who will use the link. Additional settings can be viewed and changed at portion 228. In the illustrated example, such additional settings include allowing editing, preventing download of the content, and/or specifying link expiration. Other settings may include any information that may bear upon the sharing operation that may be of relevance to a user. Pane 220 also includes history portion 230 that displays all of the events relative to the particular share operation that generated link 216. As can be seen, an entry is created when the resource is first shared, and another entry is created when any changes, such as changing a permission to View, are made. When the settings are suitable configured the user may select the "Apply" user interface element 232 in order to persist the changes to the settings. When this occurs, the updated metadata relative to the share is saved. In one embodiment, such metadata may be saved in data store 110, however, any suitable data storage device can be used.

Figure 5:
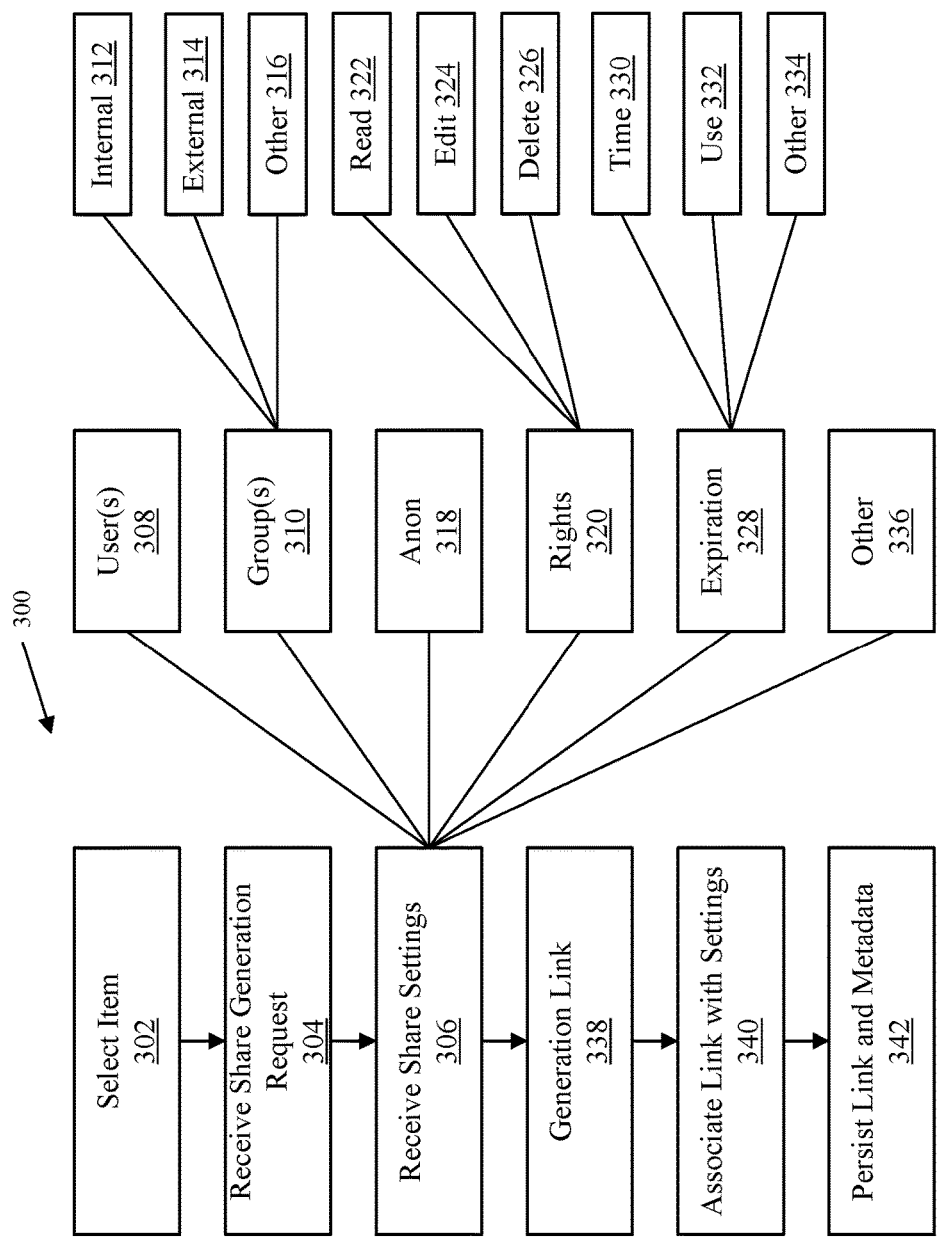
FIG. 5 is a flow diagram of a method of sharing electronic content using a data storage system in accordance with one embodiment.

FIG. 5 is a flow diagram of a method of sharing electronic content using a data storage system in accordance with one embodiment. Method 300 begins at block 302 where a user selects an item of electronic content. This may be a file, a folder, a group of folders, or any other logical grouping of information or data. Next, at block 304, the system receives a user request to generate a share with respect to the selected item(s) of content. Such a request may be in the form of a user actuating a "share" user interface element or providing any other suitable input. At block 306, share settings are received. Settings can include a wide array of information including: the specification of one or more users, as indicated at block 308; the specification of one or more groups 310, such as internal organizational groups 312, external groups 314, or groups defined based on some other criteria 316. Alternatively, the link settings may allow anonymous access, as indicated at block 318. Sharing settings can also include rights 320 conveyed to the user of the link such as "read only" as indicated at block 322, edit 324, and delete 326. Settings can also include expiration information 328, such as expiration based on a time specified in the future as indicated at block 330, a number of valid uses of the sharing link, as indicated at block 332, or some other condition, as indicated at block 334. Additionally, as indicated at block 336, other settings information can be received as well.

At block 338, link generation component 109 (shown in FIG. 1) generates a durable URL for the sharing operation. As set forth herein, a durable URL is a URL that does not change when one or more settings related to the sharing operation are later changed. In this way, the URL is decoupled from containing any significant metadata regarding the sharing operation and instead contains sufficient identification information as well as sufficient cryptographic information to allow the system to use the identification information to access metadata stored in the data storage system, or some other suitable location, regarding the sharing operation and fulfill access requests. Next, at block 340, the link generated or emitted by link generation component 109 is associated with the link settings received at block 306. One way in which this association can be performed is by creating a record or other suitable structure that contains link identification information and the settings information. Next, at block 342, the metadata is persisted. In one example, such persistence is provided by storing the record created at block 340 in the data store of the data storage system. As can be appreciated, sharing actions can be generated in parallel against a given item of content, where each share coexists individually without forcing compromise on the intent of sharing actions. Further, the number of shares that can be generated for a particular item of content is only limited by the storage resources of the system in which the metadata is stored.

Figure 6:
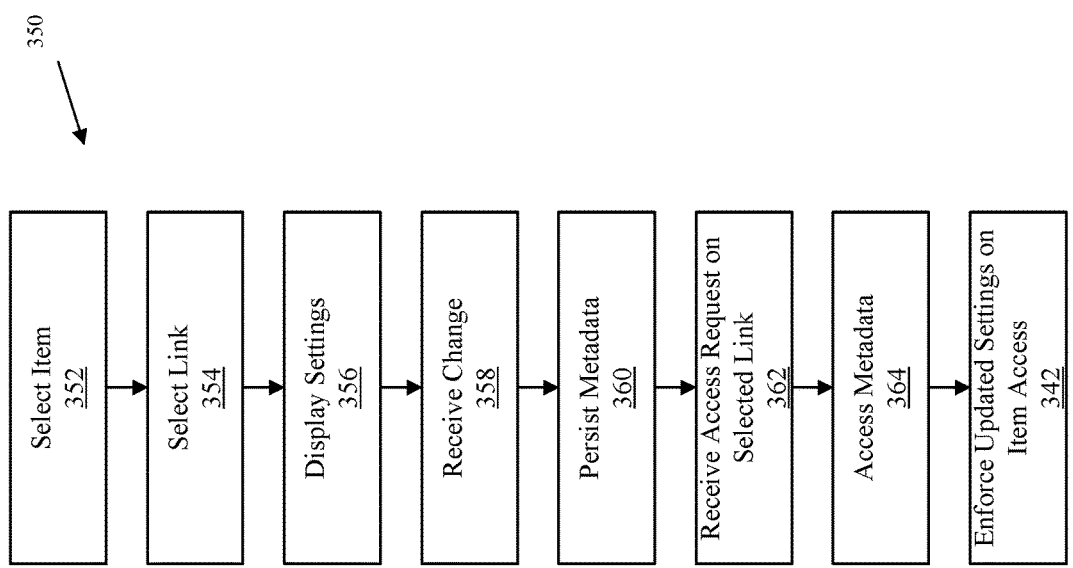
FIG. 6 is a flow diagram of a method of modifying a sharing link in accordance with one embodiment.

FIG. 6 is a flow diagram of a method of modifying a sharing link in accordance with one embodiment. Method 350 begins at block 352 where a user selects a content item that is stored by the data storage system and subject to one or more shares. Upon selection of the content item, the various shares are displayed or otherwise provided to the user, such as through pane 208 (shown in FIG. 3). At block 354, a sharing link that shares the selected content item is selected. Such selection can be performed in any suitable manner. In one example, the selection occurs when the user actuates the desired link in display pane 208. At block 356, the settings for the sharing operation with which the selected link is associated are displayed. This display can take any suitable form, but in one example, is that indicated in pane 220 (shown in FIG. 4). Next, at block 358, at least one setting change is received. For example, the sharer may change the share setting from edit to read-only. In another example, the sharer may add a user to the share. Once the share has finished making changes, the metadata is persisted or otherwise stored. In one example, the metadata is stored in data store 110. At block 362, after the metadata reflecting the changed share settings is persisted, the sharing link associated with the metadata is received by the data storage system by a user who wishes to access the selected item. Upon receiving the link access request, the data storage system accesses the associated sharing metadata at block 364 and shares or rejects the sharing of the selected item based on the updated settings, as indicated at block 366. It is noted that the link received at block 364 is the same as the link selected at block 354 and thus the link is considered a durable link in that it did not change as a result of the settings change at block 358.

Figure 7:
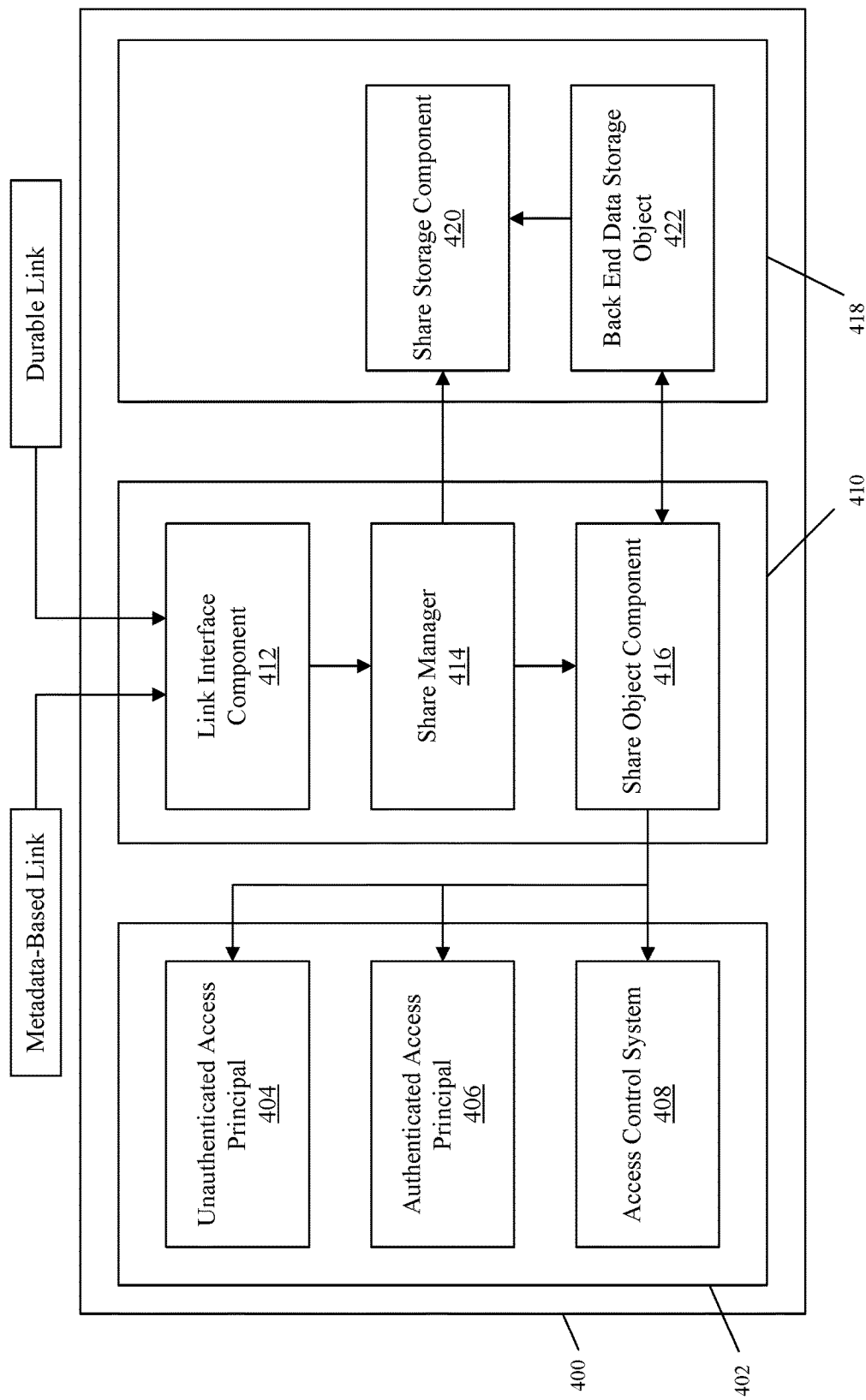
FIG. 7 is a diagrammatic view of a network-accessible data storage system capable of servicing sharing links containing sharing metadata as well as sharing links that do not contain sharing metadata, in accordance with one embodiment.

FIG. 7 is a diagrammatic view of a network-accessible data storage system capable of servicing sharing links containing sharing metadata as well as sharing links that do not contain sharing metadata, in accordance with one embodiment. As set forth above, some embodiments disclosed herein provide the ability to essentially decouple sharing links from metadata that is indicative of sharing settings. Thus, the link itself does not contain data that directly evidences a sharing setting, such as read-only access rights. Instead, the sharing link has an identified as well as some suitable cryptographic components to allow the data storage system to retrieve the sharing settings and provide access or deny access based on the retrieved sharing settings. As the new sharing link system is adopted, it is desirable to provide a network-based data storage system that is able to continue to service the previous types of sharing links, i.e. those that include at least some sharing metadata.

System 400 implements a layer of logical sharing object metadata and storage which exists parallel to the actual shareable (physical/logical elements). This helps ensure that individual sharing objects can maintain uniqueness, identify share creator/modifier, and creation/modification data. Additionally, system 400 exposes an interface on the shareable objects to interact with the sharing metadata layer so as to provide management (create, read, update, and delete) of individual shares.

System 400 provides such features. System 400 includes authentication component 402 having unauthenticated access principal 404, authenticated access principal 406 and access control system 408. Additionally, system 400 includes share management subsystem 410 having link interface component 412, share management component 414 and share object component 416. System 400 also includes share storage system 418 that includes share storage component 420 and back end data storage object 422.

Link interface component 412 is configured to receive at least two types of sharing links and service them accordingly. A first type of sharing link includes at least some metadata that is directly indicative of a particular sharing setting. A second type of sharing link is a durable link that includes an identifier that must be used to access sharing settings stored in the data access system, or some other suitable location, before access to the shared item can be provided. Link interface component 412 is configured, via hardware, software, or a combination thereof, to determine a link type and process the link according to its type. In this way, system 400 is able to essentially subsume previously recorded sharing operations using new flexible sharing set forth herein.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
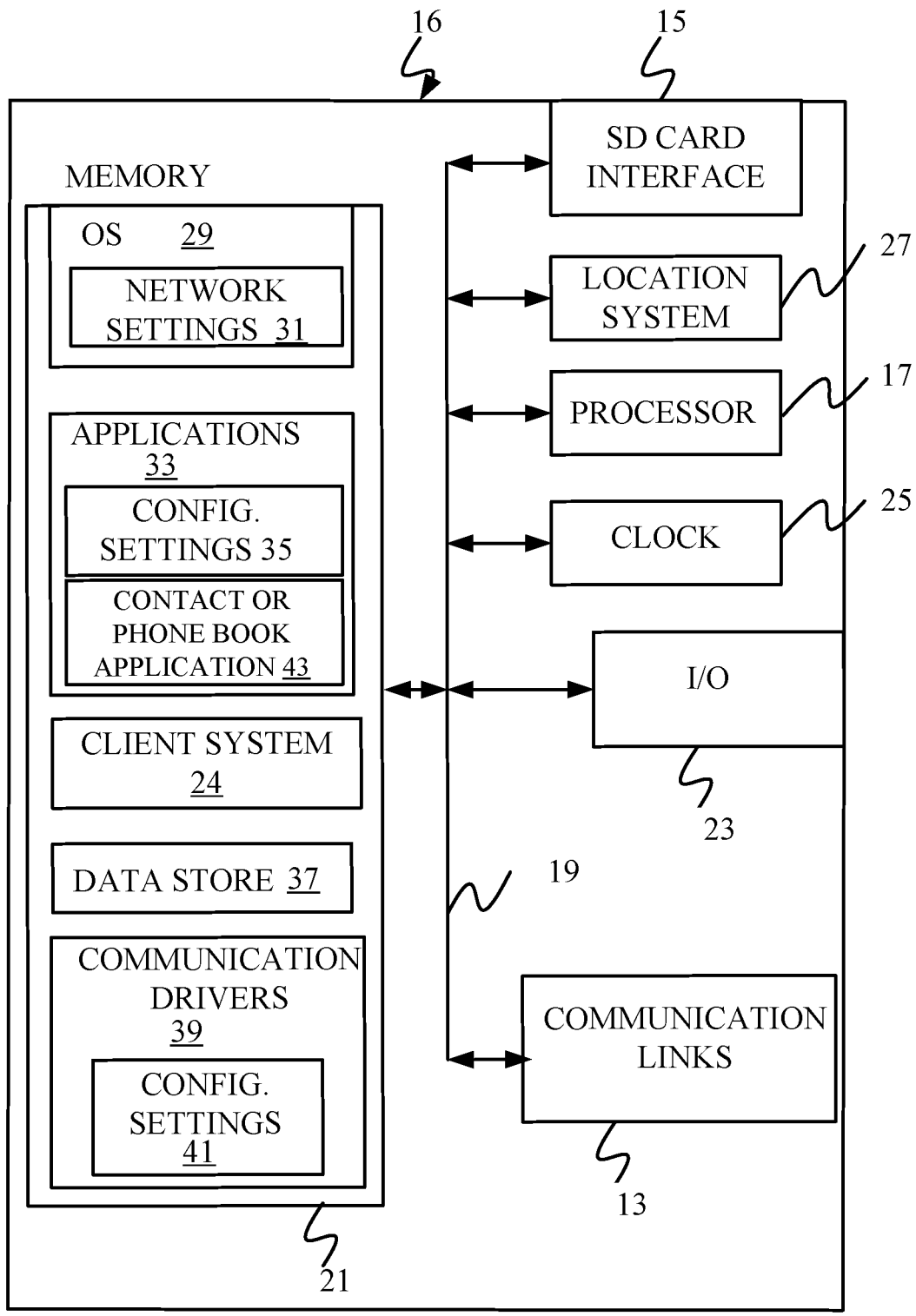
FIG. 8 provides a general block diagram of the components of a client device that can run components of the data storage system to interact with the data storage system.
Figure 9:
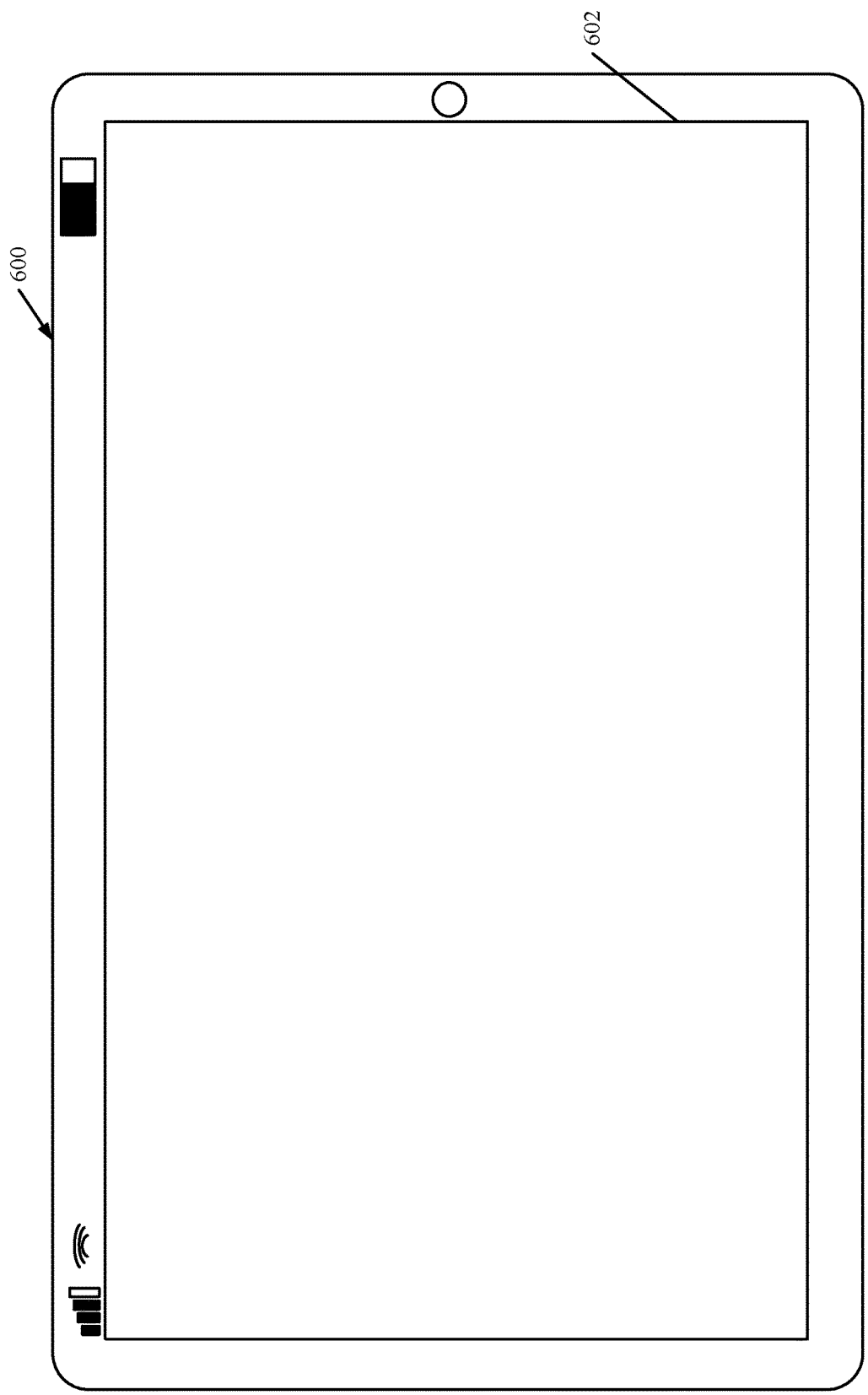
FIGS. 9 and 10 are diagrammatic views client devices that can run components of the data storage system to interact with the data storage system.
Figure 10:
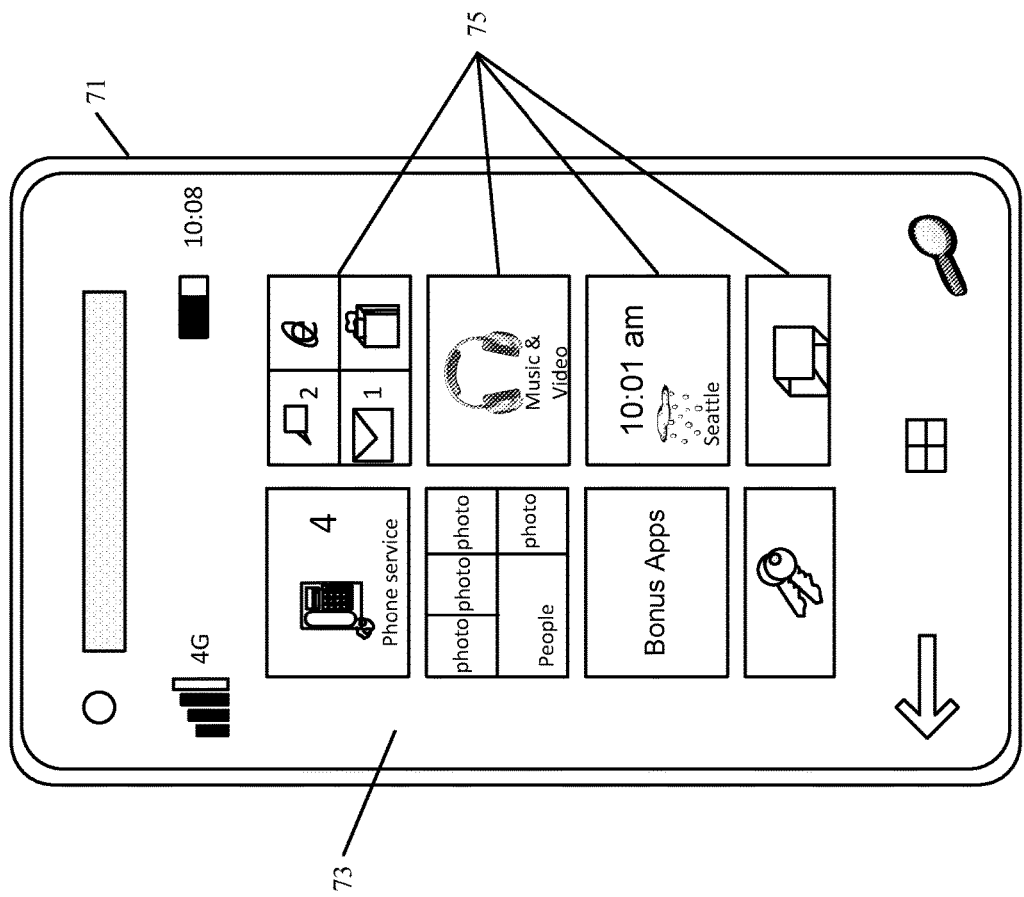

FIG. 8 is a simplified block diagram of one illustrative embodiment of a handheld or mobile computing device that can be used as a user's or client's hand held device 16, in which the present system (or parts of it) can be deployed. FIGS. 9 and 10 are examples of handheld or mobile devices.

FIG. 8 provides a general block diagram of the components of a client device 16 that can run components of data storage system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like messaging application 24) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real-time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Memory 21 can also store messaging application 24 in order to allow the user to send and receive electronic messages. Additionally, memory 21 can also store a dedicated application that allows the user to interact with online storage system 100 through a suitable application programming interface.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 9 shows one embodiment in which device 16 is a tablet computer 600. In FIG. 9, computer 600 is shown with display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 10 is a diagrammatic view of another mobile device in which embodiments described herein are particularly useful. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of the devices 16 are possible.

Figure 11:
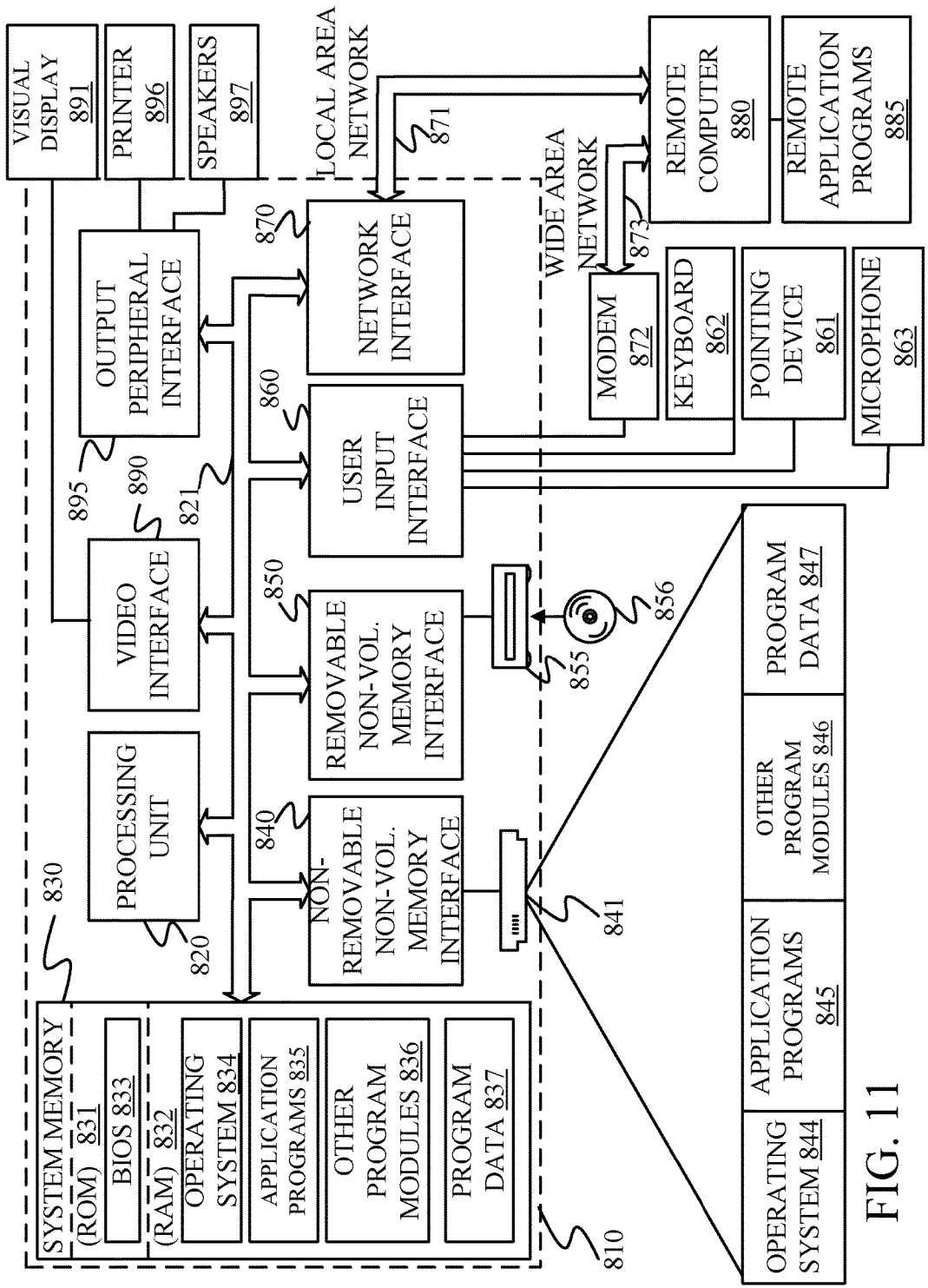
FIG. 11 is a general block diagram of a computing device that can run components of a data access system or client device that interacts with the data access system, or both.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820, system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 or FIG. 7 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system configured to provide access to electronic content. The computing system includes a processor, a data store, an access control system, and a user interface component. The data store is coupled to the processor and is configured to store the electronic content. The access control system control system is configured to selectively allow a requestor to access the electronic content based on a stored metadata setting that is associated with the link. The user interface component is configured to receive a setting change related to a share associated with the link and to persist metadata associated with the setting change.

Example 2 is the computing system of any or all previous examples wherein the link is a durable link.

Example 3 is the computing system of any or all previous examples wherein the metadata is stored within the data store.

Example 4 is the computing system of any or all previous examples and further comprising a link interface component configured to receive at least two different types of sharing links.

Example 5 is the computing system of any or all previous examples wherein one type of sharing link is a durable link.

Example 6 is the computing system of any or all previous examples wherein the stored metadata setting indicates a user who is allowed to access the electronic content.

Example 7 is the computing system of any or all previous examples wherein the stored metadata setting indicates a user's permission relative to the electronic content.

Example 8 is the computing system of any or all previous examples wherein the stored metadata setting indicates an expiration condition of the share associated with the link.

Example 9 is the computing system of any or all previous examples wherein the link includes a link identifier that is stored with the metadata.

Example 10 is the computing system of any or all previous examples wherein the link includes a cryptographic component.

Example 11 is a computer-implemented method of sharing electronic content. The method includes method receiving a selection of an item of electronic content and receiving a request to share the electronic content. At least one share setting is received and a link having a link identifier is emitted. A record containing metadata related to the at least one share setting and the link identifier is stored.

Example 12 is the computer-implemented method of any or all previous examples wherein the link is a durable link.

Example 13 is the computer-implemented method of any or all previous examples and further comprising receiving the link in an access request for the item of electronic content and accessing the record to determine the at least one share setting.

Example 14 is the computer-implemented method of any or all previous examples and further comprising selectively allowing access to the item of electronic content based on the at least one share setting in the record.

Example 15 is a computer-implemented method of sharing electronic content. The method includes receiving a selection of a link that shares an item of electronic content and displaying a share setting associated with the link. At least one share setting change is received and metadata indicative of the at least one share setting change is persisted. A request to access the item of electronic content using the link is received access to the item of electronic content is selectively allowed based on the stored, changed share setting.

Example 16 is the computer-implemented method of any or all previous examples wherein displaying the share setting includes displaying a history of events related to the share.

Example 17 is the computer-implemented method of any or all previous examples wherein persisting the metadata indicative of the at least one share setting includes saving a record in a data store of an electronic data storage system.

Example 18 is the computer-implemented method of any or all previous examples wherein the at least one share setting change includes a permission setting and wherein the link is a durable link.

Example 19 is the computer-implemented method of any or all previous examples wherein the durable link is unchanged as a result of the change in the permission setting.

Example 20 is the computer-implemented method of any or all previous examples and further comprising accessing a record containing metadata indicative of the at least one share setting change in response to the request to access the item of electronic content.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system configured to provide access to electronic content, the system comprising:
   a processor;
   memory coupled to the processor and containing instructions that when executed provide an access control system and a user interface component;
   a data store coupled to the processor and configured to store the electronic content;
   the access control system being configured to selectively allow a requestor to access the electronic content based on a stored metadata setting that is associated with a durable link having a link identifier and a copying cryptographic component configured to allow the computing system to retrieve at least one share setting; and
   wherein the user interface component is configured to receive a setting change related to a share associated with the link after distribution of the link and to persist metadata associated with the setting change within the data store.

2. The computing system of claim 1, and further comprising a link interface component configured to receive at least two different types of sharing links.

3. The computing system of claim 2, wherein one type of sharing link is a durable link.

4. The computing system of claim 1, wherein the stored metadata setting indicates a user who is allowed to access the electronic content.

5. The computing system of claim 4, wherein the stored metadata setting indicates a user's permission relative to the electronic content.

6. The computing system of claim 4, wherein the stored metadata setting indicates an expiration condition of the share associated with the link.

7. The computing system of claim 1, wherein the link identifier is stored with the metadata.

8. A computer-implemented method of sharing electronic content with a computing system, the method comprising:
   receiving a selection of an item of electronic content;
   receiving a request to share the electronic content;
   receiving at least one share setting;
   emitting a durable link having a link identifier and a cryptographic component configured to allow the computing system to retrieve the at least one share setting;
   receiving a setting change related to the at least one share setting after generation of the durable link; and
   storing a record containing metadata related to the at least one share setting and the link identifier in a data store of the computing system.

9. The computer-implemented method of claim 8, and further comprising receiving the link in an access request for the item of electronic content and accessing the record to determine the at least one share setting.

10. The computer-implemented method of claim 9, and further comprising selectively allowing access to the item of electronic content based on the at least one share setting in the record.

11. A computer-implemented method of sharing electronic content, the method comprising:
    receiving a selection of a durable link that shares an item of electronic content wherein the durable link includes an identifier that allows system access to a share setting;
    displaying the share setting associated with the durable link;
    receiving at least one share setting change after generation of the durable link;
    persisting metadata indicative of the at least one share setting change within a data store;
    receiving a request to access the item of electronic content using the link; and
    selectively allowing access to the item of electronic content based on the stored, changed share setting.

12. The computer-implemented method of claim 11, wherein displaying the share setting includes displaying a history of events related to the share.

13. The computer-implemented method of claim 11, wherein the at least one share setting change includes a permission setting.

14. The computer-implemented method of claim 13, wherein the durable link is unchanged as a result of the change in the permission setting.

15. The computer-implemented method of claim 11, and further comprising accessing a record containing metadata indicative of the at least one share setting change in response to the request to access the item of electronic content.

* * * * *